United States Patent
Lu et al.

[11] Patent Number: 6,104,749
[45] Date of Patent: Aug. 15, 2000

[54] MESSAGE FRAME AND FLOW CONTROL IN A DIGITAL SUBSCRIBER LINE TELECOMMUNICATIONS SYSTEM

[75] Inventors: Xiaolin Lu, Plano; Dennis G. Mannering, Garland, both of Tex.

[73] Assignee: Texas Instruments Incorporated, Dallas, Tex.

[21] Appl. No.: 09/001,055

[22] Filed: Dec. 30, 1997

Related U.S. Application Data

[60] Provisional application No. 60/059,190, Sep. 17, 1997.
[51] Int. Cl.$^7$ ............................................ H04B 1/38
[52] U.S. Cl. ........................ 375/222; 375/354; 370/230; 370/235
[58] Field of Search ........................... 375/222, 257, 375/219, 354; 370/229, 230, 210, 522, 485, 486, 484, 505, 235, 236; 455/517

[56] References Cited

U.S. PATENT DOCUMENTS

| | | | |
|---|---|---|---|
| 5,666,366 | 9/1997 | Malek et al. | 370/505 |
| 5,864,554 | 1/1999 | Rostoker et al. | 370/395 |
| 5,978,855 | 11/1999 | Metz et al. | 709/249 |

*Primary Examiner*—Amanda T. Le
*Assistant Examiner*—Dac V. Ha
*Attorney, Agent, or Firm*—Tammy L. Williams; Warren L. Franz; Frederick J. Telecky, Jr.

[57] ABSTRACT

A method of communicating bit groups between a first DSL modem and a second DSL modem. The method receives at the first DSL modem a first bit group from the second DSL modem. The first bit group comprises a flow control bit in a fixed location within the first bit group. In response to the flow control bit being in a first state, the method transmits a second bit group from the first DSL modem to the second DSL modem, wherein the second bit group consists of filler data. In response to the flow control bit being in a second state, the method transmits a third bit group from the first DSL modem to the second DSL modem, wherein the third bit group comprises data other than filler data.

42 Claims, 3 Drawing Sheets

MESSAGE FRAME AND FLOW CONTROL IN A DIGITAL SUBSCRIBER LINE TELECOMMUNICATIONS SYSTEM

CROSS-REFERENCES TO RELATED APPLICATIONS

This application claims the benefit, under 35 U.S.C. §119(e)(1), of U.S. Provisional Application No. 60/059,190, entitled "Flow Control And Messaging Techniques For the MDSL Modem," having as its inventors Ms. Xiaolin Lu and Mr. Dennis G. Mannering, filed Sep. 17,1997, and incorporated herein by this reference.

STATEMENT REGARDING FEDERALLY SPONSORED RESEARCH OR DEVELOPMENT

Not Applicable.

BACKGROUND OF THE INVENTION

The present embodiments relate to telecommunications systems, and are more particularly directed to message frame and flow control in a digital subscriber line telecommunications system.

The exchange of digital information between remotely located computers is now a pervasive part of modern computing, and occurs in all sorts of contexts including business, education, and personal computer use. In addition, such uses by all current predictions appear to be even more desirable in the future. Video on demand ("VOD") is one area which has for some time driven the advancement of technology in this area. More recently, the rapid increase in use and popularity of the Global Internet (hereafter, the "Internet") has perhaps surpassed the excitement created by VOD. This Internet focus also has further motivated research and preliminary development of systems directed to advanced communication of information between remotely located computers. These factors as well as the continuing evolution of computer information exchange gives rise to the present embodiments.

One type of technology arising from the above and continuing to evolve is referred to in the art as digital subscriber line ("DSL"). DSL is a public network technology that delivers relatively high bandwidth over conventional telephone company copper wiring at limited distances. As explored briefly below, DSL has been further separated into several different categories. All of these differing DSL categories are currently developing, some at different rates than others. In any event, the evolution prevents an absolute definition of any specific DSL category, but some observations may be made at the current time and are explored below.

Given the various DSL technology categories, it may be stated that each differs in some respects while each also shares some similarities. As to differences of the DSL categories, they may diverge in one or more of the expected data transfer rate, the medium type and length over which data are communicated, and the scheme for encoding and decoding data for communication. As to the similarities of the DSL technologies, generally speaking each DSL system is provisioned into modem pairs. One modem of the modem pair is located at a customer site. The other modem of the modem pair is located at the site of an owner, or controller, of a twisted conductor pair network. Currently, the most evident owner or controller is a telephone company central office. Within the telephone company system, its modem is connected to communicate with some type of network, often referred to as a backbone network. The backbone network is further coupled in a network manner to provide other communication paths to and from the backbone network. These other paths are often accomplished through the use of routers, and more recently it has been proposed to eliminate routers in favor of a hardware device referred to as a digital subscriber line access multiplexer ("DSLAM"). In any event, given its network nature, the backbone network may further communicate with other information sources and, most notably under current technology, with the Internet. Thus, information accessible to the backbone network, such as Internet information, may be communicated between the central office DSL modem and a customer site with its own compatible DSL modem. Within this general system, it is also anticipated that data rates between DSL modems may be far greater than current voice modem rates. Indeed, current DSL systems being tested or projected range in rates on the order of 500 Kbps to 18 Mbps, or even faster. As explored briefly below, however, note that the higher rates for some DSL systems are only for so-called downstream communications, that is, from the central office to the customer site; thus, for those systems, communication in the other direction (i.e., upstream from the customer site to the central office) is generally at a rate considerably lower than the downstream rate. Lastly, note that most DSL technologies do not use the whole bandwidth of the twisted pair and, thus, often reserve low bandwidth for a voice channel. As a result, while a line is being used by a DSL system, the same line may concurrently communicate a voice conversation as well.

Briefly looking at perhaps the most publicized DSL technology currently being developed, it is referred to as Asymmetric Digital Subscriber Line, or "ADSL." ADSL has been standardized by ANSI as seen by its T1.413 standard. However, even given that standard, there continues to be debate and competition as to whether devices complying with the standard provide promise for future wide scale use, and indeed whether the standard requires revision. For example, the standard currently contemplates a modulation technology called Discrete Multitone (DMT) for the transmission of high speed data, but more recently it has been urged that the standard further include an alternative data transmission technique referred to as carrierless amplitude/phase modulation (CAP). In any event, given the state of the art discussion of ADSL systems, it is contemplated that they will communicate over a single copper twisted pair, and provide downstream rates on the order of 1.5 Mbps to 9 Mbps, while upstream bandwidth will range from 16 kbps to 640 kbps. Along with Internet access, telephone companies are considering delivering remote local area network ("LAN") access and VOD services via ADSL.

As to other DSL categories being developed, they include High-Bit-Rate Digital Subscriber Line ("HDSL"), Single-Line Digital Subscriber Line ("SDSL"), and Very-high-data-rate Digital Subscriber Line ("VDSL"). HDSL, unlike ADSL as described above, has a symmetric data transfer rate, that is, it communicates at the same speed in both the upstream and downstream directions. Current perceived speeds are on the order of 1.544 Mbps of bandwidth, but require two copper twisted pairs. HDSL's operating range is more limited than that of ADSL, and is currently considered to be effective at distances of approximately 12,000 feet. Beyond such a distance, HDSL communication requires signal repeaters to extend the service. SDSL delivers a comparable speed and also a symmetric data transfer as compared to HDSL, but achieves these results with a single copper twisted pair. However, the operating range of an SDSL system is limited to approximately 10,000 feet. Lastly, VDSL provides asymmetric data transfer rates, but anticipates much higher speeds than those competing DSL technologies described above. Currently, rates over a single twisted copper pair on the order of 13 Mbps to 52 Mpbs downstream, and 1.5 Mbps to 2.3 Mbps upstream, are contemplated. Note, however, that such rates are expected to operate only over a range of 1,000 to 4,500 feet.

Despite the many variations of DSL technology as introduced above, it has been recognized in connection with the inventive embodiments described below that many of the prior art approaches provide various drawbacks. For example, many of the attempted implementations for current DSL technologies are heavily constrained in hardware. More specifically, often these implementations are achieved through an application specific integrated circuit ("ASIC") or more than one ASIC. Thus, if a standard has not yet been announced, or if a standard changes as may be the case even for those standards currently in place, the ASIC may be rendered useless if it will not accommodate the new or changed standard. As another example, there is a need for DSL technologies to be easily and readily compatible with existing personal computer and workstation architectures and operating environments. As another example, many of the contemplated systems require considerable complexity for implementation. Such complexity may provide numerous drawbacks. For example, complexity may slow the implementation and continuing development of the technology. As another and perhaps most important example for a technology having such broad potential dissemination, extreme complexity may increase the cost of implementing the technology to an unacceptable level. Given the above, the present inventor sets forth below various inventive embodiments which seek to overcome the discussed drawbacks as well as others which may be ascertained by one skilled in the art.

BRIEF SUMMARY OF THE INVENTION

In the preferred embodiment, there is a method of communicating bit groups between a first DSL modem and a second DSL modem. The method receives at the first DSL modem a first bit group from the second DSL modem. The first bit group comprises a flow control bit in a fixed location within the first bit group. In response to the flow control bit being in a first state, the method transmits a second bit group from the first DSL modem to the second DSL modem, wherein the second bit group consists of filler data. In response to the flow control bit being in a second state, the method transmits a third bit group from the first DSL modem to the second DSL modem, wherein the third bit group comprises data other than filler data. Other circuits, systems, and methods are also disclosed and claimed.

BRIEF DESCRIPTION OF THE SEVERAL VIEWS OF THE DRAWING

FIG. 3 illustrates the preferred relationship of frames and messages;

FIG. 4a illustrates the preferred relationship of a packet to frames and messages, where the packet is encoded in several messages but does not require all frames in the final message for completion;

FIG. 4b illustrates the preferred relationship of a packet to frames and messages, where the packet is encoded in a single message and does not require all frames in the singe message for completion;

FIG. 5 illustrates the preferred format for a message, and further details the information encoded in the header of each message;

DETAILED DESCRIPTION OF THE INVENTION

Figure 1:
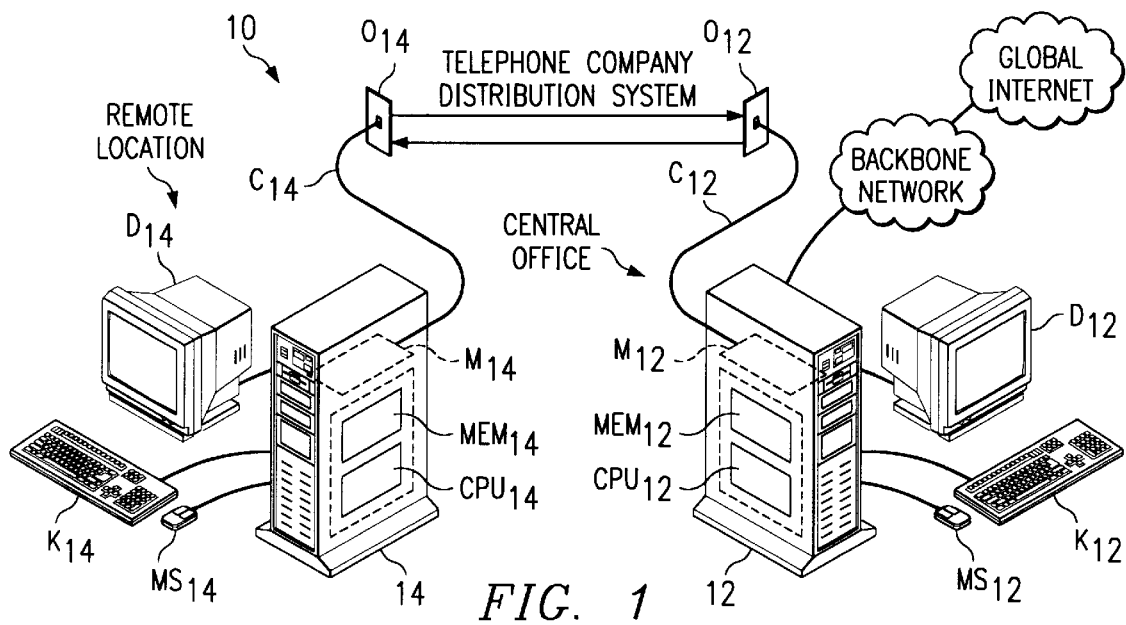
FIG. 1 illustrates a preferred telecommunications systems implementing a first digital subscriber line ("DSL") modem in a corresponding host computer at a remote location and a second DSL modem in a corresponding host computer at a central location having access through a network to the global Internet.

FIG. 1 illustrates a system 10 depicting by way of example the context in which the present inventive embodiments may be implemented. By way of example, system 10 includes aspects which relate to two different geographic locations, one being a telephone company central office and the other being a location remote from that office and, hence, referred to in this document as a remote location. For purposes of appreciating a common example, the remote location may be a home or office of a user in that location while the central office may be any of those types of offices included in a telephone company system. Stated simply, therefore, these two locations may be fairly close together, or vast distances apart, yet they both may benefit from the present embodiments. These benefits as well as the details of the inventive embodiments are presented below.

At a minimum for illustrating the preferred embodiments, each of the central office and remote location houses a computer 12 and 14, respectively. Computers 12 and 14 may be of any type of known computer configurations and, indeed, the type of computing device at the remote location may well differ from the type or configuration of that used at the central office (e.g., a rack system). Typically, therefore, a user of either computer may provide input to a corresponding computer, such as by way of a keyboard K and a mouse MS or other input or pointing device as known in the art. To simplify the present illustration, note for purposes of FIG. 1 that each of the reference identifiers for these items (i.e., K and MS) as well as for other items discussed below further includes a subscript reciting the reference number of the corresponding computer. For example, computer 12 includes keyboard $K_{12}$ and mouse $MS_{12}$. Continuing with this convention and looking to other attributes of computers 12 and 14, each computer preferably includes some device for presenting output to a user, such as a display D in the case of FIG. 1. Internally to each computer may be various circuits including those mounted on circuit boards and/or cards, including a motherboard (shown in phantom) which includes a memory MEM, a central processing unit CPU or more than one such CPU as may likely be the case for host computer 12, and likely other circuitry (not shown). Of particular note to the present embodiments, also included preferably internal to each computer and, thus, shown in phantom, is a modem M so that each of computers 12 and 14 may communicate with one another over a standard telephone company distribution system. In the case of host computer 12, note that it is likely to actually include and support multiple modems, although only one is shown to simplify the illustration as well as the following discussion. Looking to the distribution system along which the modems communicate, it includes twisted conductor pairs accessible for a connection between computers 12 and 14. In this regard, modem $M_{14}$ of computer 14 provides an output which is provided to a standard telephone or other applicable connector and, thus, is connected to a telephone wall outlet $O_{12}$ via a standard telephone communication cable $C_{12}$. This connection permits communication from modem $M_{14}$ over the telephone company distribution system and, therefore, with modem $M_{12}$ of computer 12. Note that while comparable connections using cable $C_{14}$ and outlet $O_{14}$ are shown at the telephone company, more typical industrial type connections may actually exist at that end of the connection. Lastly, given the communications of modems $M_{12}$ and $M_{14}$ with one another, note that in the preferred embodiment such communications are by way of a DSL category referred to as Medium-bit-rate Digital Subscriber Line (MDSL) technology, which currently contemplates downstream communications up to 2.8 Mbps and upstream communications up to 768 Kbps. One skilled in the art, however, will appreciate that many of the present teachings also provide aspects and benefits which may be implemented in other DSL categories.

Given system 10 of FIG. 1, it is intended that its components are used within the present inventive scope to accomplish DSL communications between modems $M_{12}$ and $M_{14}$. In this regard, note that computer 12 is connected via an appropriate interface I/F to a backbone network. This network may be of various types, with Ethernet being a popular contemporary example. As a result, computer 12 may communicate with any other device or resource which also is coupled to communicate with the backbone network. Indeed, as one example, FIG. 1 illustrates that the Internet is also coupled to the backbone network through some kind of networking architecture. Consequently, computer 12 may communicate, via the backbone network, with the Internet. Additionally, due to the modem-to-modem communication path between computers 12 and 14, computer 14 also may use DSL communications for accessing other media available to computer 12 at the telephone company central office.

Figure 2:
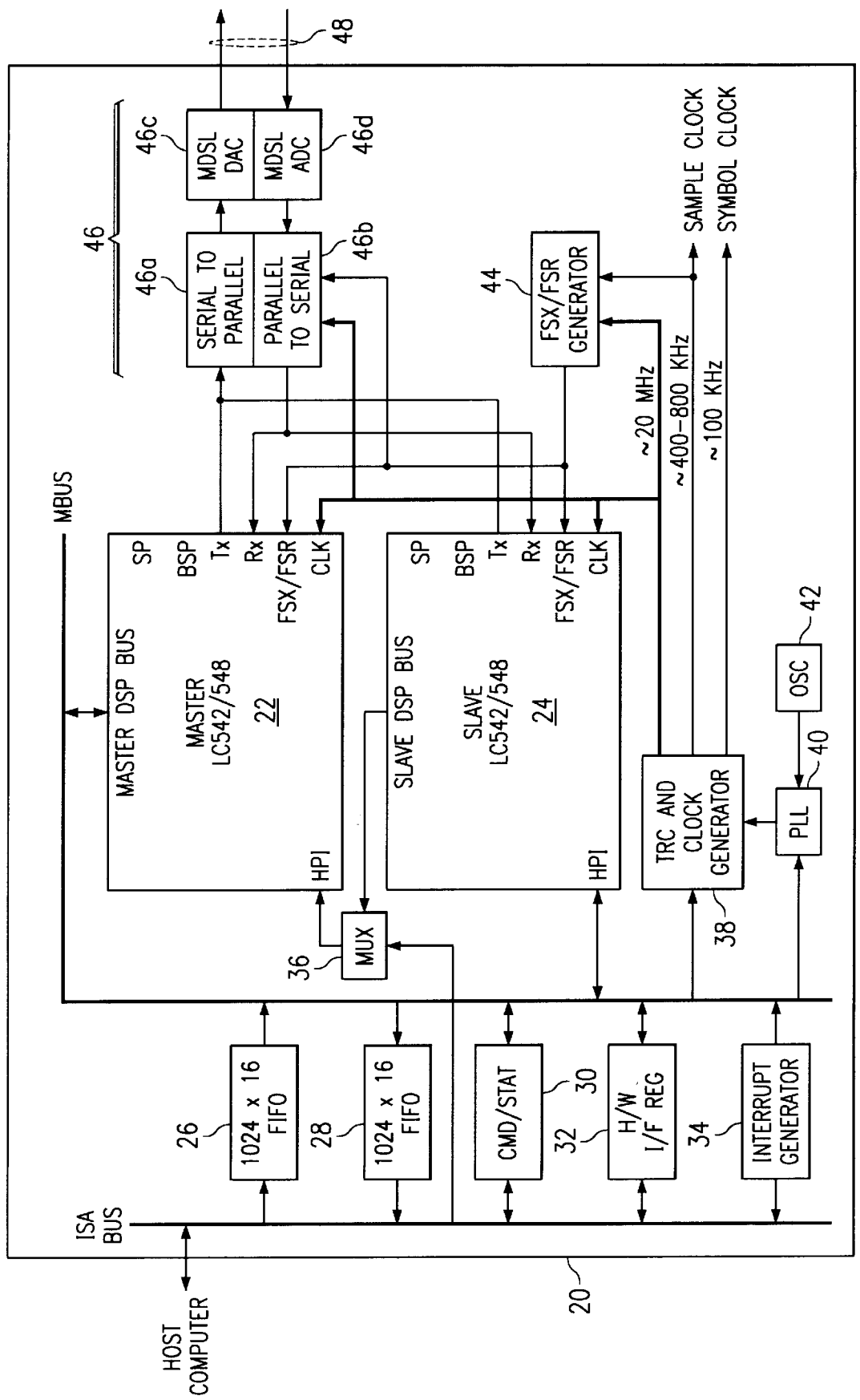
FIG. 2 illustrates a block diagram of a preferred DSL modem card.

FIG. 2 illustrates a block diagram of a computer card modem 20 serving as the preferred embodiment for forming modems $M_{12}$ and $M_{14}$, with it understood under the preferred embodiment that a modem located at a remote site such as modem $M_{14}$ further includes sufficient circuitry for timing recovery while such circuitry is not included on a central office modem such as modem $M_{12}$. Turning now to the specific illustration of FIG. 2, modem 20 includes a first digital signal processor ("DSP") 22 and in the preferred embodiment includes a second DSP 24 as well. Currently, DSPs 22 and 24 are implemented as device numbers TMS320LC542 or TMS320LC548 commercially available from Texas Instruments Incorporated. However, it is contemplated that other DSPs may be used, and further that a single DSP may indeed be sufficient for alternative embodiments. Returning to the embodiment of FIG. 2, DSPs 22 and 24 are configured in the microcomputer mode where, in that mode, the internal memory of each DSP is divided to include 2K words of program memory and 10K words of program/data for the TMS320LC542, or to include 2K words of program memory and 32K words of program/data for the TMS320LC548. The division of the 10K or 32K words between program and data is programmable. Further with respect to DSPs 22 and 24, they are configured in a master/slave configuration, with DSP 22 serving as the master and DSP 24 serving as the slave. Thus, from this point forward, these DSPs are referred to as master DSP 22 and slave DSP 24. Master DSP 22 has access to all the peripheral circuits on modem 20 and also controls the operation of slave DSP 24. Additionally, in the preferred embodiment, a DSL algorithm for communicating data according to a DMT algorithm is implemented in master DSP 22, while a DSL algorithm for communicating data according to a CAP algorithm is implemented using both master DSP 22 and slave DSP 24.

Looking generally to the left of FIG. 2, modem 20 includes an industry standard architecture ("ISA") bus which provides the interface of modem 20 to a corresponding computer. In the preferred embodiment, the ISA bus is a accessed by way of a single full-sized 16 bit bus as typically available within an IBM compatible computer. Thus, modem 20 may be inserted into the full size slot having access to this ISA bus, and perform the functionality and interaction with the corresponding computer as described throughout this document. Given this connection and that modems $M_{12}$ and $M_{14}$ are preferably implemented in this computer card fashion for internal installation into a corresponding computer, by way of convention for the remainder of this document the corresponding computer is referred to as a host computer with respect to its corresponding modem. Thus, in the example of FIG. 1, each of computers 12 and 14 is hereafter referred to as a "host" with respect to its corresponding modem $M_{12}$ and $M_{14}$. Similarly, since modem 20 is illustrative of either modem $M_{12}$ and $M_{14}$, it should be understood that when the host computer is referred to with respect to modem 20, it is intended to apply to that computer which corresponds to a particular use of modem 20. In any event, returning now to the particular structure of modem 20, the ISA bus communicates with various circuits, each of which is discussed below.

Two similar circuits communicating with the ISA bus include a FIFO 26 and a FIFO 28. The difference between FIFOs 26 and 28 is in the direction of the data path between the ISA bus and an internal modem bus designated the MBUS. In the preferred embodiment, each of FIFOs 26 and 28 is operable to store up to 1024 binary quantities, where each quantity is 16 bits wide. In operation, these quantities represent DSL data communicated from the host computer to modem 20 in the case of FIFO 26, and from modem 20 to the host computer in the case of FIFO 28. In other words, once a connection is established as detailed later, the host computer may transmit DSL data via the ISA bus to FIFO 26, and that data is then ultimately communicated from modem 20 to a remote modem at another site. In a similar manner, when modem 20 receives DSL data from a remote site, it is communicated via the ISA bus to the host computer by presenting it in appropriate size quantities to FIFO 28.

The ISA bus is further connected to a command/status register 30 (abbreviated as CMD/STAT in FIG. 2) which is a general purpose 16 bit bi-directional register. The number of storage entities of command/status register 30 may be chosen so as to accomplish the functionality described in this document below, as well as any other functionality as may be implemented by one skilled in the art. In the preferred embodiment, this functionality includes the passage of commands from the host computer to modem 20, but in an alternative embodiment may further include the passage of commands from modem 20 to the host computer. The information stored in command/status register 30 also reports various status information from modem 20 to the host computer. In this regard, in the preferred embodiment the bits of command/status register 30 are not dedicated, but instead, they are loaded by master DSP 22 in response to a request from the corresponding host computer. In other words, at any given point, a particular bit in command/status register 30 may represent one type of information in response to a request, while at another point the same bit may represent a different type of information. In any case, these various types of information are preferably maintained in software by master DSP 22 for reporting to command/status register 30, and include a ringing/dialing bit, an acknowledgment bit, a ring-back bit, status bits, and a connection bit, each discussed later. Lastly, command/status register 30 may be used to download the executable code for master DSP 22 from the host computer.

The ISA bus is further connected to a hardware interface register 32 (abbreviated H/W I/F REG in FIG. 2), which is a general purpose 16 bit bi-directional register and has a sufficient number of entries for storing two types of interface information. The first type of information stored in hardware interface register 32 permits a handshaking between modem 20 and its host computer. This information includes two bits, one corresponding to the host computer and the other corresponding to modem 20. Each of these bits is set by the corresponding device either while or after it sends a command, and is reset by the receiving device once that device receives the command. For example, a first one of these bits may be set by the host computer when it issues a command to command/status register 30 and directed to modem 20, and then modem 20 will reset that same bit once it reads the sent command from command/status register 30. The second type of information stored in hardware interface register 32 indicates an approximate level of the quantity of data stored in FIFOs 26 and 28. In the preferred embodiment, these levels are set at full, empty, or half-full. Thus, this information may be obtained by either modem 20 or its host computer to coordinate the communication of DSL data between the two.

The ISA bus is further connected to an interrupt generator 34. In the preferred embodiment, interrupt generator 34 is operable to receive a control signal from modem 20 via the MBUS and in response to that signal to issue an interrupt to the host computer via the ISA bus. Note, however, that in an alternative embodiment interrupt generator 34 is operable to provide an interrupt in the opposing direction, that is, an interrupt may be commenced by the host computer writing a command to command/status register 30 to trigger an interrupt to modem 20 via the MBUS. Returning briefly to the preferred embodiment, an example of the use of interrupt generator 34 occurs in the receipt of DSL packet data by modem 20 from another modem. More particularly, when such packet data is received by modem 20, it writes an identifier to command/status register 30 as further discussed later, and it also issues a control signal to interrupt generator 34 which in turns presents an interrupt to the host computer via the ISA bus. At this juncture, therefore, and in response to the interrupt, the host computer reads the identifier in command/status register 30 to determine what caused the corresponding interrupt, and in the present case to determine that DSL packet data has arrived in modem 20.

As a final connection relating to the ISA bus, note that it provides an input to a multiplexer 36 (abbreviated "MUX" in FIG. 2) which has an output connected to the host port interface ("HPI") of the master DSP 22. This connection permits the host computer to write to the internal random access memory ("RAM") of master DSP 22 and, in this regard, the written information may include the executable code for operation of master DSP 22. While discussing multiplexer 36, note that it has a second input connected to the data output of slave DSP 24. Due to this connection, slave DSP 24 may also write to the internal RAM of master DSP 22 and, once again, the written information may include executable code for master DSP 22. Completing the discussion in this regard, note lastly that the data output of master DSP 22 is connected to the MBUS, and the MBUS is connected to the HPI of the slave DSP 24. Thus, as a final observation, master DSP 22 may write to the internal RAM of slave DSP 24, where that written information may include executable code for slave DSP 24.

Modem 20 further includes various circuitry related to operational timing. In this context, modem 20 includes a timing recovery and clock generator 38, a phase lock loop 40, and an oscillator 42. Accordingly, oscillator 42 provides a reference signal to phase lock loop 40, thereby providing a further control signal to timing recovery and clock generator 38 which is a programmable clock generator integrated circuit. In response, timing recovery and clock generator 38 provides a first timing signal to the clock inputs of DSPs 22 and 24, and also provides reference signals (shown as the Sample Clock and the Symbol Clock) to a serial timing signal generator 44 associated with DSPs 22 and 24 and for use by other circuitry (not shown).

Concluding FIG. 2, modem 20 includes an analog front end ("AFE") 46. AFE 46 includes the necessary circuitry for communicating DSL frames between modem 20 and a conductor pair 48. From the context of FIG. 1, note that conductor pair 48 of FIG. 2 is representative of a part of the telephone company distribution system which therefore permits modem 20 to communicate with a compatible modem. Thus, if modem 20 of FIG. 2 is thought of as modem $M_{14}$ in FIG. 1, then conductor pair 48 permits modem 20 to communicate with modem $M_{12}$ in the telephone company central office. Looking to AFE 46 in more detail, note that DSPs 22 and 24 communicate DSL frames (either sending or receiving) through a buffered serial port (abbreviated on each DSP as BSP in FIG. 2). Thus, AFE 46 includes a serial-to-parallel converter 46a for converting serial information communicated from either DSP to a parallel format, and further includes a parallel-to-serial converter 46b for converting parallel information to serial information for presentation to the BSP in either DSP 22 or 24. Additionally, AFE 46 includes a digital-to-analog converter 46c for converting the parallel data from serial-to-parallel converter 46a to a form suitable for transmission to twisted pair 48, and further includes an analog-to-digital converter 46d for converting the data from twisted pair 48 to a form suitable to present to parallel-to-serial converter 46b. Although not shown, it should be understood that AFE 46 further includes a sufficient connector or hardware interface to connect twisted pair 48 to modem 20, where various types of such devices are ascertainable by one skilled in the art.

Given the hardware descriptions set forth above, reference is now turned to the formatting and flow control of information between modems $M_{12}$ and $M_{14}$ introduced above. Particularly, under the preferred embodiment, each host computer 12 and 14 may communicate various types of information to its corresponding modem $M_{12}$ and $M_{14}$. In response to that information, the corresponding modem generally responds in at least one of two manners. As one response, the corresponding modem may issue a formatted command to the other modem where that command is based on the information received from the host computer. For more examples of this type of activity, the reader is invited to review U.S. application Ser. No. 09/001,125, entitled "Modem Host Interface In A Digital Subscriber Line Telecommunications System", having inventors Xioalin Lu and Dennis Guy Mannering, filed Dec. 30, 1997, and which is hereby incorporated herein by reference. As another response, the corresponding modem may insert the information received from its corresponding host computer into a format and then transmit the formatted information to the other modem. In either case, for each modem in the preferred embodiment this formatting is accomplished via software and the one or more DSPs on the corresponding modem card. In addition, each modem also maintains flag registers to control the flow of communication of the formatted information between the modems to maintain proper communications, and to minimize conditions such as lock up of one or both modems. The details of the formatting and flow control are discussed below.

To commence an understanding of the formatting aspects introduced above, FIG. 3 illustrates the fundamental unit of information of communications between modems $M_{12}$ and $M_{14}$ and its relationship to other communicated information. Particularly, this fundamental unit of information is the frame. In FIG. 3, nine frames are shown with each having a designation "F" plus a subscript indicating its ordering in the sequence of frames (i.e. $F_1$ through $F_9$). The frame is described as the fundamental unit of communication because it is the base group or block of information communicated between modems $M_{12}$ and $M_{14}$, and thus various larger communications are made up of one or more frames. Each frame in the same direction of communication (i.e., either upstream or downstream) includes the same number of bits. However, the number of bits for downstream frames is contemplated as considerably higher than the number of bits for upstream frames. In addition, for either upstream or downstream frames, in the preferred embodiment the number of bits is a multiple of a fixed number (e.g., a multiple of 16 bits). The specific number of bits included in a frame in the preferred embodiment is determined based on the signal to noise ratio (SNR) of the line of communication between modems $M_{12}$ and $M_{14}$, but for purposes of the present embodiments the particular details of this determination need not be set forth. Instead, one skilled in the art should appreciate that the frame represents a fixed length unit for a given period and direction of communications, and since the other information units are composed of frames it should be appreciated that the frame boundaries also define the beginning and end of those other units. Additionally, by way of example, note that in one current embodiment providing a rate of communication in approximately the middle of the rates presently contemplated by DSL technology, an upstream frame includes 44 words with each word being 16 bits (i.e., 704 bits), while a downstream frame includes 12 words of 16 bits each (i.e., 192 bits). Lastly, DSL communications are synchronous communications; thus, once the physical layer is connected, under the preferred embodiment there is always a continuous stream of frames being communicated along the downstream path from modem $M_{12}$ to $M_{14}$, and also once the layer is connected there is likewise always a continuous stream of frames being communicated along the upstream path from modem $M_{14}$ to $M_{12}$. Consequently, when neither user nor system (e.g., control) data is being communicated, these frames are mere filler data. In any case, the continuous flow of frames provides a basis for timing in the synchronous system.

Above the frames in FIG. 3 are shown a sequence of three messages, using the designation "MG" plus a subscript indicating an ordering in the sequence of messages (i.e. $MG_1$ through $MG_3$). At this point the illustration of FIG. 3 is intended to show the relative nature of frames as they combine to form messages. In FIG. 3, therefore, frames $F_1$ through $F_3$ are used to form message $MG_1$. In the preferred embodiment each message is formed using the same number of frames, and this one number applies to both upstream and downstream messages. In the example of FIG. 3, therefore, each message is three frames long and, thus, both upstream and downstream messages for the present example consist of three frames. FIG. 3, however, is merely an illustration by way of example. In the preferred embodiment, the actual number of frames in a message is determined by the programmer based on what he or she seeks as the maximum number of words (i.e., 16 bit quantities) in a message, and the number of words in a frame. This determination also may be affected in view of the characteristics of the downstream communication link from modem $M_{12}$ to modem $M_{14}$ (also sometimes referred to as channel characteristics). For example, if the programmer determines that a message should not exceed 65 words and if the frame size is 20 words, then the number of frames per message is three (or less) frames. Once the number of frames per message is set for downstream communication, this same number of frames is used per message for upstream communications. Moreover, the rate of communication of messages is the same between modems $M_{12}$ and $M_{14}$ regardless of the communication direction (i.e., either upstream or downstream). Thus, during the same time modem $M_{12}$ transmits one message to modem $M_{14}$, modem $M_{14}$ transmits one message to modem $M_{12}$. However, recall that the frame size for downstream communications is considerably larger than the frame size for upstream communications. By the above definition relating frames to messages, therefore, the one message with three frames from modem $M_{12}$ to modem $M_{14}$ provides considerably more bits than the one message with three frames from modem $M_{14}$ to modem $M_{12}$. It is in this manner that the effective overall rate of bits communicated is larger for downstream communications as compared to upstream communications.

Having demonstrated the general format of messages and their relationship to frames, a discussion is now provided by way of context as to the use of messages to communicate various matters between modems $M_{12}$ and $M_{14}$. In general, there are three types of such uses and, thus, these types may be thought of as defining three types of corresponding messages. These three types of messages are filler messages, user messages, and system messages. Each of these messages is described below, after which follows a description further detailing how the type of message is specified within the format of the message.

Filler messages are named as such because they provide filler data between modems $M_{12}$ and $M_{14}$ as introduced earlier. Thus, during a time when neither user nor system messages are being communicated in a given direction between modems $M_{12}$ and $M_{14}$, then each message is a filler message communicated to maintain timing. As a result, when a modem receives a filler message and detects it to be such a message, it need not inform its host computer or otherwise remove any data from that message for communication onward to any software layer within that host computer.

User messages are named as such because each user message includes user data. For purposes of this document, user data may be best described by way of examples. For instance, when a user of host computer 14 is reviewing e-mail received from host computer 12, then the text of that message is user data. As another example, when a user of host computer 14 is browsing the Internet from communications from host computer 12, then the graphical interface (including text) is also user data. Stated simply, therefore, user data is typically data which is intended for meaningful presentation to the user, or is sent by the user to the Internet or some other recipient for presentation or some other common use of such information. Given this introduction to user data, note further that it is sometimes referred to as packet data. Thus, consistent with this terminology in the present embodiments, a "packet" or "data packet" is one or more frames of user data. However, note that user data may be either less than or greater in size than the size of a single message as contemplated by the present embodiments. This concept is further illustrated in FIGS. 4a and 4b, each of which is briefly discussed below.

FIG. 4a illustrates a packet $P_1$ which is larger than a single message but ends on a non-message edge. More particularly, messages $MG_4$, $MG_5$, and $MG_6$ are used to communicate packet $P_1$. Since packet $P_1$ spans over the entirety of messages $MG_4$ and $MG_5$, then each frame of those messages includes valid user data. Note, however, that packet $P_1$ does not extend the full length of message $MG_6$. Instead, the last two frames in message $MG_6$ (i.e., frames $F_{17}$ and $F_{18}$) do not carry valid user data, but due to the fixed number of frames per message are still communicated because the first frame of message $MG_6$ (i.e., frame $F_{16}$) is required to transmit the final portion of user data in packet $P_1$.

FIG. 4b illustrates a packet $P_2$ which is smaller than a single message and, thus, by definition also ends on a non-message edge. Here, somewhat analogous to message $MG_6$ in FIG. 4a, packet $P_2$ extends over only some of the frames in a message. More particularly, in FIG. 4b, packet $P_2$ ends with frame $F_{20}$. Thus, the last frame in message $MG_7$ (i.e., frame $F_{21}$) does not carry valid user data, but due to the fixed number of frames per message is still communicated because the first two frames of message $MG_7$ (i.e., frames $F_{19}$ and $F_{20}$) are required to transmit the user data of packet $P_2$.

System messages are generally those which are neither filler data nor user data as defined above. In this regard, the above incorporated U.S. application Ser. No. 09/001,125 (Attorney docket TI-24317) provides extensive detail regarding various examples of instances where a host computer issues a command to its corresponding modem, and the modem responds by sending what is referred to only as a "message" in the incorporated patent to the other modem to which it is connected. As one example from the incorporated patent, once a connection is established between modems, a host computer may issue a DropConnection command to its modem. The DropConnection command arises when an application program issues a request to end a connection to a modem driver, and the driver in response issues the DropConnection command to the corresponding modem. In response to the DropConnection command, the modem transmits a corresponding drop connection message to the other modem to which it is connected. This corresponding drop connection message is an example of a system message. Many others are in the incorporated patent, and still others will be ascertainable by one skilled in the art.

FIG. 5 illustrates the preferred format for each message of FIGS. 3 through 4b described above. In general, there are two categories of information in each message, those being either overhead or data. Looking briefly to each, the message overhead includes two header words $HEADER_1$ and $HEADER_2$, as well as a checksum/CRC word $CC_1$. For purposes of the preferred embodiment, a word is defined as 16 bits; thus, each of these overhead quantities is preferably a 16 bit quantity. In the preferred embodiment, header words $HEADER_1$ and $HEADER_2$ are identical, that is, assuming proper operation and no errors then header word $HEADER_2$ is merely a repetition of header word $HEADER_1$. This allows the software receiving the message to verify the message control information. Particularly, when the message is received, a modem within the present inventive scope compares header words $HEADER_1$ and $HEADER_2$ with one another and deems an error in the message if the two header words do not match. One of the responses to a detected error in this regard is detailed later in the discussion of flow control. Other potential responses to such an error are beyond the discussion of the preferred embodiment. As further shown by an expanded view in FIG. 5, each of header words $HEADER_1$ and $HEADER_2$ includes three fields, consisting of a flow control flag ("FCF") field, a message type field, and a data byte length field, all of which are detailed later. Looking to checksum/CRC word $CC_1$, it provides standard checksum and/or cyclic redundancy code information as known in the art; thus this information may be used for error detection upon receipt of an entire message. Concluding with the message data in FIG. 5, it may be used to carry either user data or parameters associated with a system message.

As introduced above, each header word $HEADER_1$ and $HEADER_2$ includes an FCF field, a message type field, and a data byte length field. The preferred bit location of each of these items is shown in FIG. 5 and, thus, the FCF field is located at bit 15, the message type field is located at bits 14-11, and the data byte length field is located at bits 10-0. Each of these items is discussed separately below, proceeding in the order from lowest ordered bits to highest ordered bits.

The data byte length field (i.e., bits 10-0) specifies the number of valid data bytes included in the same message which provides the header. Note that some messages do not include any valid data. In this case, therefore, the data byte length field indicates zero valid data bytes. As an example, zero valid data bytes may occur for a message spawned from a command as discussed earlier in connection with the incorporated application Ser. No. 09/001,125. As to remaining messages, the number of valid data bytes they include depends on the type of the message, and the limits of the size of a message. Recall that the size of a message is ultimately determined by its directionality (i.e., either upstream or downstream). Thus, the maximum number of bytes as specified by the data byte length field is similarly limited.

The message type field (i.e., bits 14-11) specifies, as its name indicates, the type of message corresponding to the header. Recall that message types were introduced earlier, and include filler messages, user messages, and system messages. Thus, a different code is provided by the message type field for each of these different types of messages. Additionally, in the preferred embodiment, note further that there are various different types of system messages. Accordingly, the message type field may further include different designations for these different types of system messages. To further illustrate the above, the following Table 1 sets forth various messages, and the message number encoded in the message type field to designate the corresponding message.

TABLE 1

| Message Number | Message |
| --- | --- |
| 0 | Packet Data (continued) |
| 1 | Packet Data (completed) |
| 2 | Request Connection Message (continued) |
| 3 | Request Connection Message (completed) |
| 4 | Answer Connection Message |
| 5 | Disconnect Message |

TABLE 1-continued

| Message Number | Message |
|---|---|
| 6 | Acknowledge Request Connection Message |
| 7 | Acknowledge Answer Connection Message |
| 8 | Acknowledge Disconnect Message |
| 9 | Filler Message |

Given Table 1, note a few additional observations. First, since the message type field is preferably a four bit field, then it may encode up to 16 (i.e., $2^4=16$) different messages. Since Table 1 only illustrates ten messages, then therefore the remaining six indicators are not defined yet remained reserved for additional use. Second, message numbers 0 and 1 are user messages, message numbers 2 through 8 are system messages further detailed in the above-incorporated application Ser. No. 09/001,125, and message number 9 is a filler message. Third, message numbers 0 through 3 include an indication of either "continued" or "completed" indicating a status for those types of messages which may require more bits than are available in a single message to encode the corresponding message. For example, returning to FIG. 4a, packet $P_1$ requires three messages (i.e., messages $M_4$, $M_5$, and $M_6$) to encode the full packet. Thus, for message $M_4$, the message type in each of its headers will indicate packet data, and more particularly will indicate "packet data (continued)" from Table 1, with the "(continued)" indication meaning that the message is continued in one or more following messages before the given group of packet data is complete. This same is true of message $MG_5$. For message $MG_6$, however, it presents the conclusion of packet $P_1$; thus, its message type will indicate "packet data (completed)" from Table 1, with the "(completed)" indication meaning that the message is the last message corresponding to a given packet of user data.

The FCF field relates to the mechanism for controlling the flow of user messages between modems under the preferred embodiment. Particularly, the state of the single bit FCF field (i.e., either on or off) is analyzed by the modem receiving the message containing the FCF field to indicate to the receiving modem whether it may transmit a packet data message back to the transmitting modem. More specifically and as detailed below, when a receiving modem receives a message and the FCF field of that message is off (e.g., equal to zero), then the receiving modem is thereafter only permitted to transmit a filler message. In contrast, when a receiving modem receives a message and the FCF field is on (e.g., equal to one), then the receiving modem may thereafter transmit any type of message (i.e., user, system, or filler). This operation, contingent on the FCF field, is controlled by way of a flag referred to in this document as a send flag, and maintained by the receiving modem as detailed later. This flag may be created and maintained in various locations, such as in the memory or registers of either master DSP 22 or slave DSP 24 discussed in connection with FIG. 2. Given the effect of the FCF field, note further it must be properly maintained and communicated by the transmitting modem. This operation is also controlled by way of a flag, where the flag is referred to in this document as a receive flag, and maintained by the transmitting modem. Once again, such a flag may be may be created and maintained in various locations of either master DSP 22 or slave DSP 24. Lastly, given that messages are communicated bi-directionally between modems under the preferred embodiment, note that a given modem operates as either a receiving modem or a transmitting modem depending on a particular instance of a communication; thus, each modem includes a send flag to control what type of message it may send, and further includes a receive flag to indicate to another modem what type of message the other modem may send. The details of such flags are presented below in connection with FIGS. 6 and 7.

Figure 6:
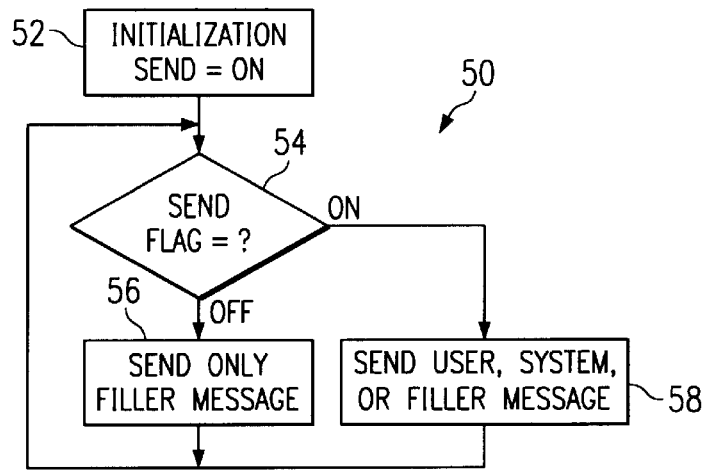
FIG. 6 illustrates a flowchart of the preferred methodology of limiting the type of message transmitted in response to a send flag in a DSL modem.

FIG. 6 illustrates a flowchart of the preferred method 50 for a modem transmitting messages in response to its send flag. As stated above, each modem in accordance with the preferred embodiment includes a send flag and, thus, method 50 applies equally to modems $M_{12}$ and $M_{14}$ of FIG. 1. However, to facilitate an understanding of FIG. 6, the following discussion is directed to modem $M_{14}$ in the case where it is operating to transmit messages to modem $M_{12}$. Naturally, therefore, one skilled in the art should appreciate that the same concepts apply to the opposite scenario where modem $M_{14}$ is communicating messages to modem $M_{12}$.

Method 50 commences with step 52, which represents the state of the send flag of modem $M_{14}$ once the initialization procedure is complete. Particularly, after initialization, the send flag of modem $M_{14}$ is set to on. Next, method 50 continues from step 52 to step 54. Step 54 examines the send flag, and responds in alternative fashions based on whether the send flag is on or off. If the send flag is off, then method 50 continues from step 54 to step 56. In step 56, modem $M_{14}$ is permitted to communicate only a filler message. Alternatively, if the send flag is on, then method 50 continues from step 54 to step 58. In step 58, modem $M_{14}$ is permitted to communicate any type of message. Thus, if no system or user message is ready for communicating, then modem $M_{14}$ communicates a filler message as in the case of step 56. However, if either a system or user message is available for transmission, then step 58 permits such a message to be transmitted by modem $M_{14}$ to modem $M_{12}$.

After either step 56 or step 58, method 50 returns to step 54. Thus, one skilled in the art will appreciate that modem $M_{14}$ consults its send flag before each message is transmitted, and continues to operate in the above-described fashion each time returning to step 54 (unless the modem is re-initialized in which case the flow returns to step 52). In addition, note that FIG. 6 alone only demonstrates the setting of the send flag to on (in step 52). Consequently, without further action, method 50 would repeatedly pass between steps 54 and 58. However, in the preferred embodiment, various events may affect the state of the send flag, and those events are shown below in connection with FIG. 7. Thus, one skilled in the art should appreciate that the methods of FIGS. 6 and 7 operate concurrently, so that any given time the decision of step 54 may be further influenced by a change arising from the operation of the method of FIG. 7.

Figure 7:
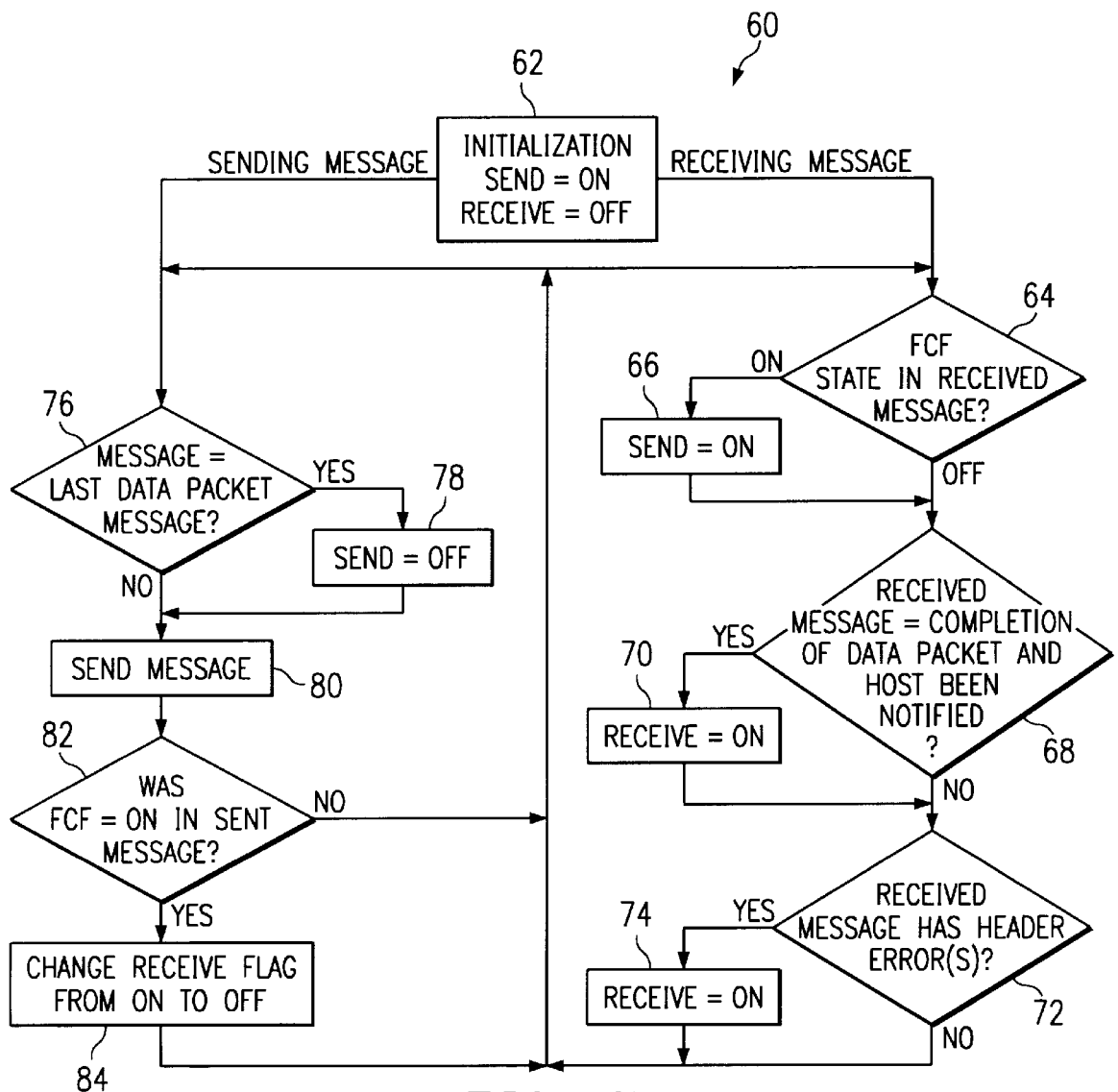
FIG. 7 illustrates a flowchart of the preferred methodology of establishing and changing the states of a send flag and a receive flag in a DSL modem.

FIG. 7 illustrates a flowchart of the preferred method 60 for a modem further establishing and changing the values of its send and receive flags. Once again, each modem in accordance with the preferred embodiment includes such flags and, thus, method 60 applies equally to modems $M_{12}$ and $M_{14}$ of FIG. 1. However, the following discussion is directed to modem $M_{14}$ to simplify the discussion, with it understood that the same concepts apply to modem $M_{12}$.

Method 60 commences with step 62, which represents the state of the send and receive flags of modem $M_{14}$ once the initialization procedure is complete. From step 52 of FIG. 6, recall that the send flag of modem $M_{14}$ is set to on. In addition, step 62 further illustrates that upon completing initialization the receive flag of modem $M_{14}$ is set to off. The next step of the flow of method 60 depends on whether modem $M_{14}$ is receiving a message or sending a message, where either event may affect the value of either or both of the send and receive flags. In the case where modem $M_{14}$ is receiving a message, method 60 continues from step 62 to a path including steps 64 through 74. In the case where modem $M_{14}$ is sending a message, method 60 continues from step 62 to a path including steps 76 through 84. Each of these alternative paths is described below.

Looking to the instance where modem $M_{14}$ is receiving a message, in step 64 modem $M_{14}$ evaluates the FCF field in the received message. If the FCF field is on, method 60 continues from step 64 to step 66. In step 66, modem $M_{14}$ sets the state of its send flag to on and continues from step 66 to step 68. Thus, at this point and absent any other consideration, recall from FIG. 6 that this setting of the send flag to on will permit modem $M_{14}$, as shown in step 58, to transmit any type of message as its next transmitted message. Returning to step 64, if the FCF field is off, method 60 continues from step 64 to step 68.

In step 68 modem $M_{14}$ evaluates whether the received message is the last message in a data packet. From Table 1, note in the preferred embodiment that this step is accomplished by examining the message type field in the header of the received message and, more particularly, determining whether that field indicates a value of 1. If indeed the received message is the last message in a data packet, and further if modem $M_{14}$ has been able to notify its host computer that this last message in a data packet has been received, then method 60 continues from step 68 to step 70. In this regard, note in the preferred embodiment that such notification is by way of modem $M_{14}$ issuing an interrupt to host computer 14 via command/status register 30, and this occurs only if there is no other interrupt which was earlier issued by modem $M_{14}$ to command/status register 30 and which is still pending. If such an interrupt is pending, then modem $M_{14}$ waits until that interrupt is serviced and cleared. Assuming that no such other interrupt is pending or that any such interrupt has been serviced, then modem $M_{14}$ is permitted to issue an interrupt to host computer 14 indicating that the last message in a data packet has been received, after which method 60 continues to step 70. In step 70, modem $M_{14}$ sets the state of its receive flag to on and continues to step 72. The effect of setting the receive flag is discussed later in connection with step 84 relating to the transmission of a message by modem $M_{14}$. Returning to step 68, if the received message is not the last message in a data packet, method 60 continues from step 68 to step 72.

In step 72 modem $M_{14}$ evaluates whether there is a header error in the received message. Recall in the preferred embodiment that the header m each message is duplicated. Accordingly, step 62 is preferably accomplished by comparing the $HEADER_1$ and $HEADER_2$ to one another. If the two match, then no error is deemed to have occurred, whereas if there is a mis-match, then an error occurs for purposes of step 72. Given this analysis, if the received message includes a header error, method 60 continues from step 72 to step 74. In step 74, modem $M_{14}$ sets the state of its receive flag to on, whereas if there is no header error, then the state of the receive flag is not changed. In either event, following step 72 or step 74 method 60 returns to the point of flow just after step 62. Thus, once again the method proceeds based on whether the next action is the receipt or transmission of a message.

Returning now to the operation following step 62 but looking to the instance where modem $M_{14}$ is sending a message, in step 76 modem $M_{14}$ determines whether the message it is preparing to transmit is the last message in a data packet. If the message to be transmitted is the last message in a data packet, method 60 continues from step 76 to step 78. In step 78, modem $M_{14}$ sets the state of its send flag to off and continues to step 80. Returning to step 76, if the message to be transmitted is not the last message in a data packet, method 60 continues from step 76 to step 80 without changing the state of the send flag.

In step 80, modem $M_{14}$ transmits the message. Note at this point that various considerations may take place with respect to forming the various portions of the message. For purposes of the present discussion, however, only the FCF field for the headers in the message are considered. More particularly, when modem $M_{14}$ transmits the message during step 80, it sets the value of the FCF field in that message (i.e., in both headers $HEADER_1$ and $HEADER_2$) equal to the same state as the receive flag of modem $M_{14}$. Note now, therefore, that to the extent that the state of the receive flag has been changed, that change is reflected in the FCF field, and will be detected by modem $M_{12}$ when it receives the message transmitted by modem $M_{14}$ in step 80. For example, if step 70 were earlier reached by modem $M_{14}$, then modem $M_{14}$ set its receive flag to on because it had received the last message in a data packet from modem $M_{12}$. Thus, this event thereafter causes modem $M_{14}$ in step 80, by virtue of its set receive flag, to send an on FCF field to modem $M_{12}$ in step 80. Returning to earlier steps of FIGS. 7 and 6, respectively, note the effect once modem $M_{12}$ receives this on FCF field. First, by passing through steps 64 and 66, modem $M_{12}$ sets its send flag to on. Second, by passing through steps 54 and 58, modem $M_{12}$ is permitted to send any type of message back to modem $M_{14}$. Concluding, therefore, the sending of the on FCF field by modem $M_{14}$ to modem $M_{12}$ is effectively a grant of permission to modem $M_{12}$ to proceed with transmission of its next non-filler message if it has one to transmit.

After step 80, method 60 continues to step 82 which determines whether the FCF field was set to on in the message transmitted in step 80. If the determination is affirmative, then method 60 continues to step 84 during which modem $M_{14}$ changes the state of its receive flag from on to off. Thus, unless some other intervening event has occurred, when the next message is transmitted by modem $M_{14}$ then modem $M_{14}$ transmits an off FCF field based on the receive flag which has now been set to off. In other words, given step 84, one skilled in the art will appreciate that in the preferred embodiment an on FCF field is transmitted in only a single message, after which the FCF field will be off until another event occurs at modem $M_{14}$ causing it to turn on its receive flag and thereafter to transmit a corresponding message with an on FCF field. Lastly, if the determination of step 82 is negative, then the receive flag is unchanged at this point. In either event, following step 82 or step 84 method 60 returns to the point of flow just after step 62 and, once again the method proceeds based on whether the next action is the receipt or transmission of a message.

Given the above discussion of FIGS. 6 and 7, note a final observation regarding the flow control operation as well an one additional aspect of the preferred embodiment. As an observation, note that the preferred embodiment results in the transmission of only a single instance of an on FCF field for a given event which set the receive flag for the modem to on (e.g., see steps 70 and 74). This approach is preferred in that it may avoid timing problems. Additionally, note that tracking problems may arise if multiple instances of an on FCF field were transmitted and multiple events were to occur during that time where those events each singularly could cause an on send flag (and hence an on FCF field). Given the single issuance, of an on FCF field, however, an additional aspect of the preferred embodiment is to include a timeout feature for each modem with respect to the number of filler messages it receives. In this regard and looking once more to modem $M_{14}$ as an example, it maintains a count of the number of successive filler messages it transmits. If this number exceeds a threshold, then modem $M_{14}$ changes its send flag to on. Accordingly, once modem $M_{14}$ next proceeds through method 50 of FIG. 6, it will reach step 58 and may send a non-filler message. Note, therefore, that this feature prevents a potential lock up situation which might otherwise occur. For example, assume that modem $M_{12}$ issued a message with an on FCF field. Recalling that only one such message is sent and is thereafter followed with one or more messages with an off FCF field, suppose further that modem $M_{14}$ failed to properly detect the one on FCF field from modem $M_{12}$. In this case, and given FIGS. 6 and 7, one skilled in the art will appreciate that modem $M_{14}$ would thereafter continue to endlessly transmit only filler messages. However, given the timeout feature discussed above, at some point modem $M_{14}$ will detect its count reaching the threshold, and by setting its send flag to on will thereafter once again be able to communicate a non-filler message to modem $M_{12}$. As a result, the lock-up situation is avoided.

From the above, it may be appreciated that the above embodiments provide an improved telecommunications systems including a method and apparatus directed to message frame and flow control in a digital subscriber line modem. For example, the message and flow control system provides various flexibility, and may be used in different DSL systems. Additionally, the software implementation reduces complexity, thereby reducing cost and providing a more viable system for wide-scale use and dissemination. As still another benefit, while the preceding discussion illustrates the preferred embodiment and various alternative embodiments in detail, various substitutions, modifications or alterations could be made to the descriptions set forth above without departing from the inventive scope. Indeed, the various alternatives set forth above should demonstrate to one skilled in the art that further flexibility is contemplated. Moreover, as yet another example of an alternative, note that the notion of frames is readily appreciated by one skilled in the art in the context of DSL systems implementing a modulation technology called Discrete Multitone (DMT). Nevertheless, the preferred embodiment is further contemplated as implemented in other non-framed DSL systems, such as is the case in carrierless amplitude/phase modulation (CAP). In these latter systems, while frames are not implemented, various of the present flow control teachings are indeed still workable by defining a fixed number of bits as a particular grouping, and then including within that bit grouping a location such that the bit at that location for each grouping may perform the same function as the FCF field described above. Thus, this alternative may still allow a modem to properly control the flow of information between itself and another CAP modulating modem. As a final example, while various message characteristics and their corresponding functionality have been detailed, still other embodiments may be developed by adding other parameters passed within a message, or some of the above-described parameters may be eliminated or replaced by others. Thus, these as well as other examples ascertainable by one skilled in the art should be considered within the inventive scope, as defined by the following claims.

We claim:

1. A method of communicating bit groups between a first DSL modem and a second DSL modem, comprising the steps of:

receiving at the first DSL modem a first bit group from the second DSL modem, wherein the first bit group comprises a flow control bit in a fixed location within the first bit group;

responsive to the flow control bit being in a first state, transmitting a second bit group from the first DSL modem to the second DSL modem, wherein the second bit group consists of filler data; and responsive to the flow control bit being in a second state, transmitting a third bit group from the first DSL modem to the second DSL modem, wherein the third bit group comprises data other than filler data.

2. The method of claim 1 wherein the step of transmitting a third bit group comprises transmitting user data.

3. The method of claim 1 wherein the step of transmitting a third bit group comprises transmitting system data.

4. The method of claim 1 wherein the step of transmitting a third bit group comprises transmitting one of system data or user data.

5. The method of claim 1 and further comprising the step of setting a send flag in the first DSL modem to a send flag state in response to the flow control bit, wherein the steps of transmitting the second and third bit groups are responsive to the send flag state.

6. The method of claim 5:

wherein the send flag state is set to a first send flag state responsive to the third bit group comprising a completion of a data packet; and wherein the send flag state is set to a second send flag state responsive to the flow control bit being in the second state.

7. The method of claim 1 wherein the step of transmitting the third bit group comprises transmitting the third bit group with a flow control bit at a fixed location within the third bit group.

8. The method of claim 7:

wherein the flow control bit of the third bit group is for directing the second DSL modem to transmit a fourth bit group to the first DSL modem in response to the control bit of the third bit group being in a first state, wherein the fourth group consists of filler data; and wherein the flow control bit of the third bit group is for directing the second DSL modem to transmit a fifth bit group to the first DSL modem in response to the control bit of the third bit group being in a second state, wherein the fifth group comprises non-filler data.

9. The method of claim 8:

wherein the flow control bit of the third bit group is operable to represent a first and second state;

wherein the flow control bit of the third bit group is set to the second state to direct the second DSL modem to transmit the fifth bit group to the first DSL modem; and further comprising the step of, prior to transmitting the third bit group, setting the flow control bit of the third bit group to the second state in response to the first DSL modem receiving a complete data packet from the second DSL modem.

10. The method of claim 9 and further comprising the step of, prior to transmitting the third bit group, setting the flow control bit of the third group to the second state in response to the first DSL modem receiving a bit group having a detectable error from the second DSL modem.

11. The method of claim 8:

wherein the flow control bit of the third bit group is operable to represent a first and second state;

wherein the flow control bit of the third bit group is set to the second state to direct the second DSL modem to transmit the fifth bit group to the first DSL modem; and further comprising the step of, prior to transmitting the third bit group, setting the flow control bit of the third bit group to the second state in response to the first DSL modem receiving a bit group having a detectable error from the second DSL modem.

12. The method of claim 7 wherein the step of transmitting the second bit group comprises transmitting the second bit group with a flow control bit at a fixed location within the second bit group.

13. The method of claim 12:

wherein the flow control bit of the second bit group is for directing the second DSL modem to transmit a fourth bit group to the first DSL modem in response to the control bit of the second bit group being in a first state, wherein the fourth group consists of filler data; and wherein the flow control bit of the second bit group is for directing the second DSL modem to transmit a fifth bit group to the first DSL modem in response to the control bit of the second bit group being in a second state, wherein the fifth group comprises non-filler data.

14. The method of claim 13:

wherein the flow control bit of the second bit group is operable to represent a first and second state;

wherein the flow control bit of the second bit group is set to the second state to direct the second DSL modem to transmit the fifth bit group to the first DSL modem; and further comprising the step of, prior to transmitting the second bit group, setting the flow control bit of the second bit group to the second state in response to the first DSL modem receiving a complete data packet from the second DSL modem.

15. The method of claim 14 and further comprising the step of, prior to transmitting the second bit group, setting the flow control bit of the second bit group to the second state in response to the first DSL modem receiving a bit group having a detectable error from the second DSL modem.

16. The method of claim 13:

wherein the flow control bit of the second bit group is operable to represent a first and second state;

wherein the flow control bit of the second bit group is set to the second state to direct the second DSL modem to transmit the fifth bit group to the first DSL modem; and further comprising the step of, prior to transmitting the second bit group, setting the flow control bit of the second bit group to the second state in response to the first DSL modem receiving a bit group having a detectable error from the second DSL modem.

17. The method of claim 7:

wherein the step of transmitting the second bit group comprises transmitting the second bit group with a flow control bit at a fixed location within the second bit group;

wherein the flow control bit of the third bit group is for directing the second DSL modem to transmit a fourth bit group to the first DSL modem in response to the control bit of the third bit group being in a first state, wherein the fourth group consists of filler data; wherein the flow control bit of the third bit group is for directing the second DSL modem to transmit a fifth bit group to the first DSL modem in response to the control bit of the third bit group being in a second state, wherein the fifth group comprises non-filler data;

wherein the flow control bit of the second bit group is for directing the second DSL modem to transmit a fourth bit group to the first DSL modem in response to the control bit of the second bit group being in a first state, wherein the fourth group consists of filler data; and wherein the flow control bit of the second bit group is for directing the second DSL modem to transmit a fifth bit group to the first DSL modem in response to the control bit of the second bit group being in a second state, wherein the fifth group comprises non-filler data.

18. The method of claim 17:

wherein the flow control bit of the third bit group is operable to represent a first and second state;

wherein the flow control bit of the third bit group is set to the second state to direct the second DSL modem to transmit the fifth bit group to the first DSL modem;

further comprising the step of, prior to transmitting the third bit group, setting the flow control bit of the third bit group to the second state in response to the first DSL modem receiving a complete data packet from the second DSL modem;

wherein the flow control bit of the second bit group is operable to represent a first and second state;

wherein the flow control bit of the second bit group is set to the second state to direct the second DSL modem to transmit the fifth bit group to the first DSL modem; and further comprising the step of, prior to transmitting the second bit group, setting the flow control bit of the second bit group to the second state in response to the first DSL modem receiving a complete data packet from the second DSL modem.

19. The method of claim 18 and further comprising the steps of:

prior to transmitting the third bit group, setting the flow control bit of the third group to the second state in response to the first DSL modem receiving a bit group having a detectable error from the second DSL modem; and prior to transmitting the second bit group, setting the flow control bit of the second bit group to the second state in response to the first DSL modem receiving a bit group having a detectable error from the second DSL modem.

20. The method of claim 18:

wherein the flow control bit of the third bit group is operable to represent a first and second state;

wherein the flow control bit of the third bit group is set to the second state to direct the second DSL modem to transmit the fifth bit group to the first DSL modem;

further comprising the step of, prior to transmitting the third bit group, setting the flow control bit of the third bit group to the second state in response to the first DSL modem receiving a bit group having a detectable error from the second DSL modem;

wherein the flow control bit of the second bit group is operable to represent a first and second state;

wherein the flow control bit of the second bit group is set to the second state to direct the second DSL modem to transmit the fifth bit group to the first DSL modem; and further comprising the step of, prior to transmitting the second bit group, setting the flow control bit of the second bit group to the second state in response to the first DSL modem receiving a bit group having a detectable error from the second DSL modem.

21. The method of claim 1 and further comprising the steps of:

receiving at the second DSL modem the second bit group from the first DSL modem, wherein the second bit group comprises a flow control bit in a fixed location within the second bit group;

responsive to the flow control bit in the second bit group being in a first state, transmitting a fourth bit group from the second DSL modem to the first DSL modem, wherein the fourth bit group consists of filler data; and responsive to the flow control bit in the second bit group being in a second state, transmitting a fifth bit group from the second DSL modem to the first DSL modem, wherein the fifth bit group comprises data other than filler data.

22. The method of claim 1 wherein the first DSL modem communicates with the second DSL modem using carrierless amplitude/phase modulation.

23. The method of claim 1 wherein the first DSL modem communicates with the second DSL modem using discrete multitone modulation.

24. A first DSL modem operable to communicate with a second DSL modem, the first DSL modem comprising:

circuitry for receiving at the first DSL modem a first bit group from the second DSL modem, wherein the first bit group comprises a flow control bit in a fixed location within the first bit group;

circuitry responsive to the flow control bit being in a first state for transmitting a second bit group from the first DSL modem to the second DSL modem, wherein the second bit group consists of filler data; and circuitry responsive to the flow control bit being in a second state for transmitting a third bit group from the first DSL modem to the second DSL modem, wherein the third bit group comprises data other than filler data.

25. The first DSL modem of claim 24 wherein the circuitry for transmitting a third bit group comprises circuitry for transmitting user data.

26. The first DSL modem of claim 24 wherein the circuitry for transmitting a third bit group comprises circuitry for transmitting system data.

27. The first DSL modem of claim 24 wherein the circuitry for transmitting a third bit group comprises circuitry for transmitting one of system data or user data.

28. The first DSL modem of claim 24 and further comprising circuitry for setting a send flag in the first DSL modem to a send flag state in response to the flow control bit, wherein the circuitry for transmitting the second and third bit groups are responsive to the send flag state.

29. The first DSL modem of claim 28:

wherein the send flag state is set to a first send flag state responsive to the third bit group comprising a completion of a data packet; and wherein the send flag state is set to a second send flag state responsive to the flow control bit being in the second state.

30. The first DSL modem of claim 24 wherein the circuitry for transmitting the third bit group comprises circuitry for transmitting the third bit group with a flow control bit at a fixed location within the third bit group.

31. The first DSL modem of claim 30:

wherein the flow control bit of the third bit group is for directing the second DSL modem to transmit a fourth bit group to the first DSL modem in response to the control bit of the third bit group being in a first state, wherein the fourth group consists of filler data; and wherein the flow control bit of the third bit group is for directing the second DSL modem to transmit a fifth bit group to the first DSL modem in response to the control bit of the third bit group being in a second state wherein the fifth group comprises non-filler data.

32. The first DSL modem of claim 31:

wherein the flow control bit of the third bit group is operable to represent a first and second state;

wherein the flow control bit of the third bit group is set to the second state to direct the second DSL modem to transmit the fifth bit group to the first DSL modem; and further comprising circuitry for setting the flow control bit of the third bit group to the second state in response to the first DSL modem receiving a complete data packet from the second DSL modem prior to transmitting the third bit group.

33. The first DSL modem of claim 32 and further comprising circuitry for setting the flow control bit of the third group to the second state in response to the first DSL modem receiving a bit group having a detectable error from the second DSL modem prior to transmitting the third bit group.

34. The first DSL modem of claim 31:

wherein the flow control bit of the third bit group is operable to represent a first and second state;

wherein the flow control bit of the third bit group is set to the second state to direct the second DSL modem to transmit the fifth bit group to the first DSL modem; and further comprising circuitry for setting the flow control bit of the third bit group to the second state in response to the first DSL modem receiving a bit group having a detectable error from the second DSL modem prior to transmitting the third bit group.

35. The first DSL modem of claim 30 wherein the circuitry for transmitting the second bit group comprises circuitry for transmitting the second bit group with a flow control bit at a fixed location within the second bit group.

36. The first DSL modem of claim 35:

wherein the flow control bit of the second bit group is for directing the second DSL modem to transmit a fourth bit group to the first DSL modem in response to the control bit of the second bit group being in a first state, wherein the fourth group consists of filler data; and wherein the flow control bit of the second bit group is for directing the second DSL modem to transmit a fifth bit group to the first DSL modem in response to the control bit of the second bit group being in a second state, wherein the fifth group comprises non-filler data.

37. The first DSL modem of claim 36:

wherein the flow control bit of the second bit group is operable to represent a first and second state;

wherein the flow control bit of the second bit group is set to the second state to direct the second DSL modem to transmit the fifth bit group to the first DSL modem; and further comprising circuitry for setting the flow control bit of the second bit group to the second state in response to the first DSL modem receiving a complete data packet from the second DSL modem prior to transmitting the second bit group.

38. The first DSL modem of claim 37 and further comprising circuitry for setting the flow control bit of the second bit group to the second state in response to the first DSL modem receiving a bit group having a detectable error from the second DSL modem prior to transmitting the second bit group.

39. The first DSL modem of claim 36:
- wherein the flow control bit of the second bit group is operable to represent a first and second state;
- wherein the flow control bit of the second bit group is set to the second state to direct the second DSL modem to transmit the fifth bit group to the first DSL modem; and
- further comprising circuitry for setting the flow control bit of the second bit group to the second state in response to the first DSL modem receiving a bit group having a detectable error from the second DSL modem prior to transmitting the second bit group.

40. The first DSL modem of claim 24 wherein each of the circuitry for receiving at the first DSL modem a first bit group from the second DSL modem, circuitry for transmitting a second bit group, and circuitry for transmitting a third bit group comprise a digital signal processor.

41. The first DSL modem of claim 24 wherein each of the circuitry for receiving at the first DSL modem a first bit group from the second DSL modem, circuitry for transmitting a second bit group, and circuitry for transmitting a third bit group comprise first and second digital signal processors.

42. The first DSL modem of claim 24 and further comprising a host computer for communicating with the first DSL modem, wherein the third bit group comprises information provided by the host computer to the first DSL modem.

\* \* \* \* \*